United States Patent [19]
Vansteelant

[11] 3,979,889
[45] Sept. 14, 1976

[54] FREELY ROTATABLE SHIELD FOR ROTARY MOWER

[75] Inventor: Marc G. Vansteelant, Zedelgem, Belgium

[73] Assignee: Clayson, N.V., Zedelgem, Belgium

[22] Filed: Apr. 17, 1975

[21] Appl. No.: 569,140

[30] Foreign Application Priority Data
Apr. 24, 1974 United Kingdom............... 17866/74

[52] U.S. Cl................................ 56/53; 56/DIG. 2; 56/192
[51] Int. Cl.².......................................... A01D 45/02
[58] Field of Search ........... 56/192, 1, 14.4, DIG. 1, 56/53–63, 295

[56] References Cited
UNITED STATES PATENTS

| | | | |
|---|---|---|---|
| 2,625,784 | 1/1953 | Kelsey | 56/192 |
| 3,389,539 | 6/1968 | Zweegers | 56/6 |
| 3,623,300 | 11/1971 | Konig et al. | 56/6 |

FOREIGN PATENTS OR APPLICATIONS

| | | | |
|---|---|---|---|
| 1,479,813 | 3/1967 | France | 56/192 |
| 1,483,721 | 4/1967 | France | 56/192 |

*Primary Examiner*—Russell R. Kinsey
*Attorney, Agent, or Firm*—John R. Flanagan; Frank A. Seemar; Michael R. Swartz

[57] ABSTRACT

A rotary mower comprising at least one rotary cutter unit mounted on a framework, the framework having at least one forwardly extending lower support for rotatably supporting the cutter unit at its lower end, and a freely rotatable shield disposed proximate to the foremost edge of the or each support and underneath the or each cutter unit for shielding said foremost edge.

16 Claims, 7 Drawing Figures

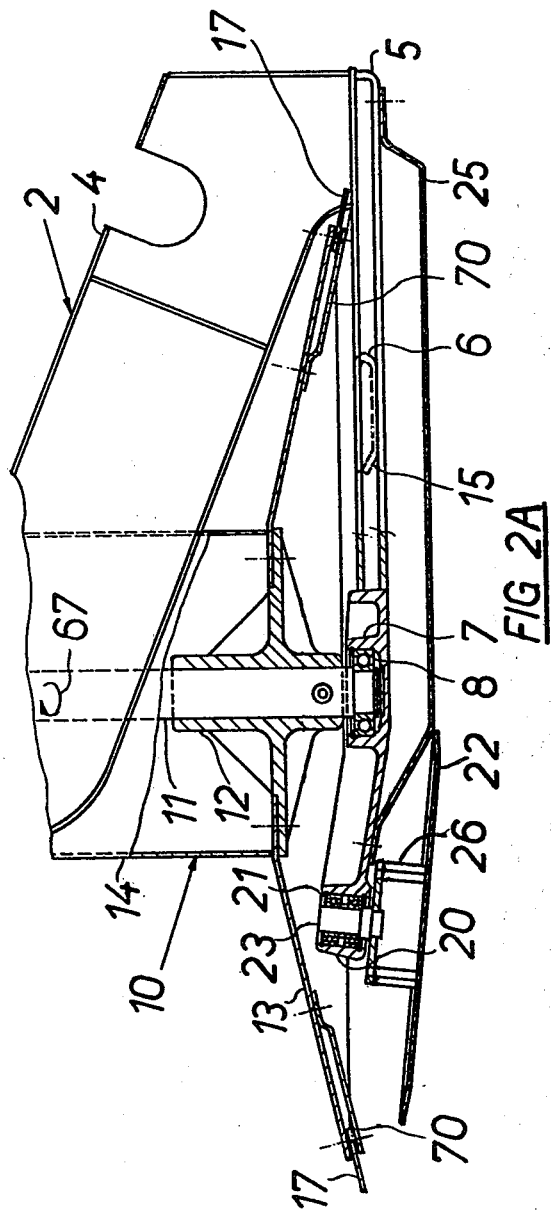

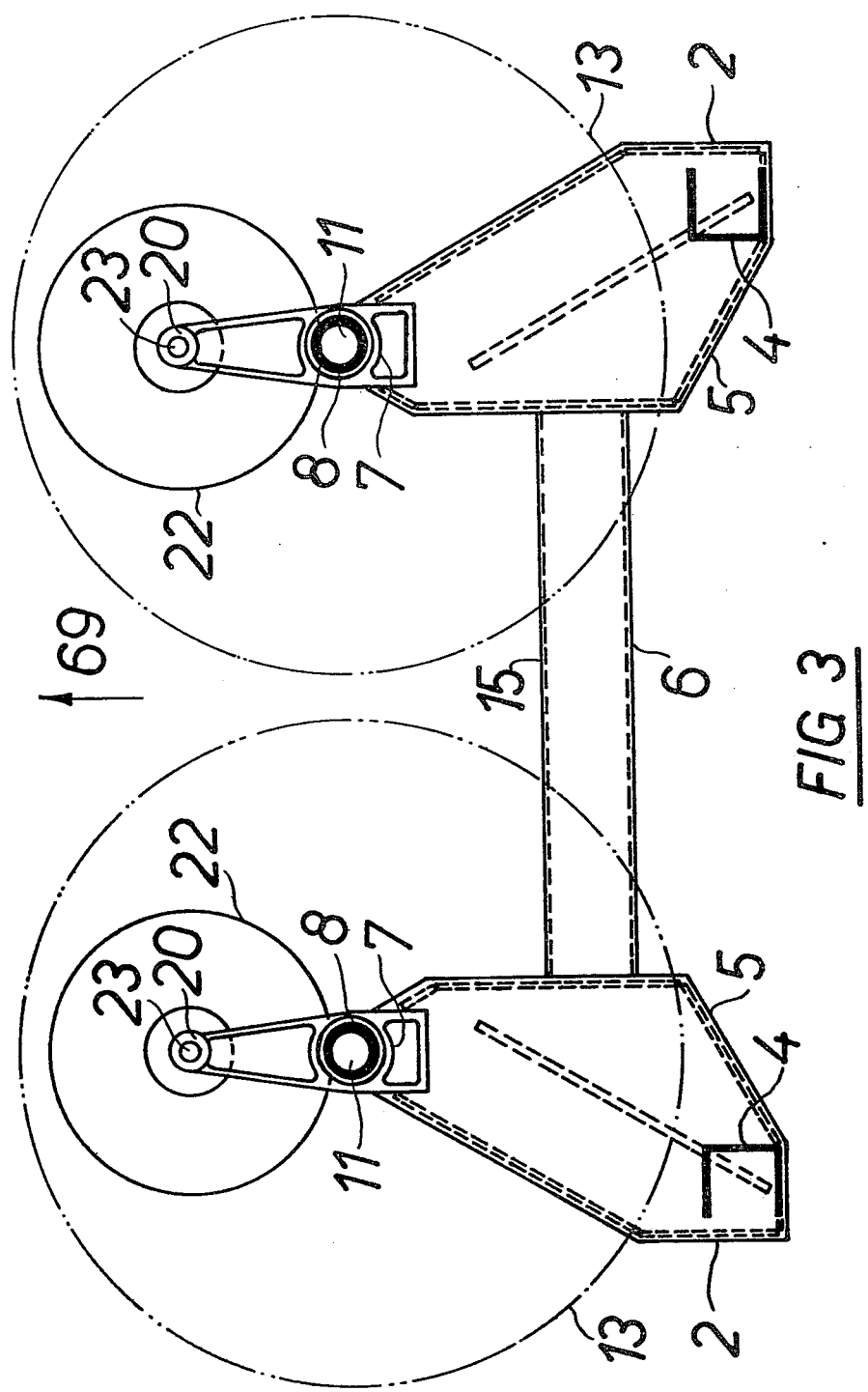

FREELY ROTATABLE SHIELD FOR ROTARY MOWER

BACKGROUND OF THE INVENTION

1. Field of the Invention

This invention relates to rotary mowers for agricultural use and more particularly to rotary mowers of the type having at least two rotatable cutter units mounted side-by-side and each supporting at least one cutter blade to cut standing crop by impact, as opposed to shearing, during forward movement of the mower. The invention is particularly useful when applied to a combined rotary mower and crop conditioner, hereinafter referred to as a "mower conditioner,". The terms "forward" and "rearward" used throughout the specification are with respect to the direction of movement of the machine in operation.

2. Description of the Prior Art

Some rotary mowers currently in use have a cutter bar comprising a housing which accomodates the drive means for the rotary cutter units. In the operative position, the cutter bar housing extends substantially parallel to the ground and in a transverse direction relative to the forward operative movement of the mower. The rotatable cutter units are arranged substantially coplanar on top of the housing and in a side-by-side relationship, whereby the cutter units are driven from below. Each cutter unit normally comprises a shaped structure supporting at its outer periphery at least one cutter blade. The trajectories of the cutter blades of adjacent cutter units normally overlap each other at a location substantially in front of the drive housing in order to ensure a clean cutting action over the whole width of the cutter bar. The cutter blades operate as impact cutters and in order to provide a sufficient cutting impact, the rotational speed of the cutter units is relatively high. After being cut, the crop usually falls on top of the cutter units, the rotational movement of which ensures the discharge of the mown crop in a rearward direction relative to the cutter bar. However, if the forward speed of the mower is sufficiently high and the crop being cut is relatively tall and dense or tangled, the cutter units then tend to slide under the cut crop so as to leave it substantially in the same generally upright position as it was in prior to being out.

Although the capacity of rotary mowers is considerably greater than conventional reciprocatory sickle bar mowers, known rotary mowers still suffer many disadvantages. For example, in the underdriven type of mower discussed above, the drive housing forms the lowermost portion of the cutterbar, and is held close to the ground to maximise the quantity of mown crop. Since the crop to be mown is usually a green crop having a high moisture content and since the crop is often wet from rain or dew, there is a tendency for pieces of mown crop and/or dirt (soil, mud, etc.) to build up at the forward edge of the drive housing and to adhere thereto, particularly at the point where the trajectories of the cutter blades of two neighbouring cutter units overlap each other. This build-up also occurs at the location where the cutter blades move towards each other or at the locations where the cutter blades move away from each other. When these accumulations of crop and/or dirt are sufficient to extend beyond the points of intersection of the cutter blade trajectories, the standing crop can no longer come within the reach of the cutter blades because the accumulations deflect the standing crop in forward direction, whereby the cutter blades pass thereover. As a result, so-called "stripping" occurs which means that one or more strips of uncut crop are left which is a waste of valuable crop and which often causes problems during the subsequent hay making operations with hay tools such as tedders, rakes and balers.

This problem of stripping is aggravated by the fact that the cutter bar often strikes mole hills, etc., the resulting spread of soil tending to increase the rsik of dirt build-up on the forward edge of the cutter bar and also tending to pollute the mown crop.

Due to the high rotational speed of the cutter units, the cutter blades often hit the stems of the crop several times before the crop is discharged rearwardly of the cutter bar. Accordingly, a considerable portion of the crop becomes chopped into small pieces and apart from the increased risk of accumulation of this material on the cutter bar drive housing, this also constitutes another disadvantage in that the volume of useful crop is reduced. The risk of crop becoming chopped is especially great when difficult crop conditions are met such as, for example, a heavy crop, an extremely wet crop, a flattened crop, or an entangled crop.

Considerable power is consumed by this undesirable chopping action. Also the rotation of the cutter units creates considerable air turbulencies which tend to deflect the crop in a forward direction which prevents the mower from cutting the crops in a clean and even manner.

When the crop is flattened or entangled, for example as a result of bad weather conditions, a clean and even cut is often very difficult, if not impossible, to attain, as the cutter blades do not cut low enough with respect to the ground. This results in the crop being mown in inappropriate lengths, if it is cut at all.

Another diadvantage resides in the fact that, as the drive means extend below the cutter units and as the cutter units should be able to cut sufficiently low in order to avoid excessive stubble length, the cutter bar housing and the drive means have to be made very compact. This induces the manufacturer to make certain design compromises, which may be detrimental to quality. As it became practically impossible to cut sufficiently low with cutter units which have their axis extending vertically, the cutter units have been tilted to some extent in a forward direction. As a result thereof, the stubble length is no longer constant over the total width of the mower as so-called "scalloping" occurs which produces an unclean cut.

In another arrangement of known rotary mower, the rotatable cutter units are formed by cylindrical bodies mounted underneath a transversely extending main beam and having circular annular flanges at their lower ends for pivotally supporting the cutter blades. These cutter units are driven from the top instead of from beneath and, therefore, the drive means may be arranged inside the main beam. At the lower end, ground-engaging supports are normally arranged underneath each of the cutter units for supporting the structure on the ground. These ground-engaging supports may be stationary units or may be freely rotatable. Crop-engaging and discharging ribs may be mounted at the upper side of the flanges and at the outer circumference of the cylindrical body portion. Many of the disadvantages of the underdriven rotary mower have been eliminated, or at least attenuated, by the foregoing top driven or so-called "drum" mower.

Indeed, a better conveying and discharging of the crops is obtained particularly by the provision of the cylindrical body portions and the provision of the crop-engaging and discharging ribs. The danger of the chopping of the crops and other disadvantages resulting therefrom have been avoided, or at least attenuated. Furthermore, a better control on the stubble height becomes possible as it is no longer necessary to provide drive means underneath the cutter blades. Also the cutter units can be held in an upright position, whereby scalloping is avoided. Nevertheless, it is possible to cut under practically all conditions, even under those conditions wherein the crop is completely flattened as the arrangement of components enables a sufficiently low cut to be effected.

Another major advantage of the drum mowers resides in the fact that, when the ground-engaging supports are freely rotatable, no build-up of dirt, etc., is likely to occur and consequently, all disadvantages resulting from such build-up are avoided.

Nevertheless, drum mowers do suffer from some substantial disadvantages. One disadvantage resides in the cantilever mounting of the cutter units on the main beam. During operation it may happen that a stone or other hard object of substantial dimensions gets jammed inbetween the flanges or drums of two neighbouring and oppositely rotating cutter units. This almost always results in considerable damage, for example the cutter units may be bent outwardly and away from each other, whereby substantial unbalance in the fast rotating components necessitates interruption of the operation of the machine to effect repair before the imbalance itself causes further damage. Also, the main beam and the drive means provided therein may become bent.

Another disadvantage resides in the fast does of bearing means for the freely-rotatable ground-engaging support discs which results from the considerable and uneven load of the latter. Indeed all the weight of the whole structure, which is supported on the ground, is transmitted to the ground via these discs and the bearings thereof. The considerable and uneven bearing load arises out of the weight of the structure and the fact that the discs normally contact the ground at a location which does not coincide with the axis of rotation thereof, so that with normal ground irregularities and a relatively high forward speed during operation of this type of machine, it will be appreciated that the bearing means for the support discs are indeed heavily and unevenly loaded causing fast wear thereof.

On the other hand, if the supporting elements underneath the cutter units of drum mowers were stationary elements, then these elements would dig into the ground and all the disadvantages of the build-up of dirt, etc. on such stationary elements which are inherent in the bottom or underdriven rotary mowers, would apply.

Mower conditioners having rotary type mower means are in use and each has a cutter bar which is principally similar to the underdriven or top driven rotary mowers discussed above. As a result, all disadvantages which are characteristic of such rotary mowers also apply to these mower conditioners. In addition, mower conditioners have other disadvantages.

All mower conditioners with a top driven rotary mower presently in use have a relatively complicated structure. The framework of the mower unit of such mower conditioners extends on top of the machine, whereas the conditioner means should extend in a transverse direction rearwardly of the mower units and at a comparatively small distance above the ground. Complicated modifications have therefore been made to the framework to arrive at a combined machine for both mowing and conditioning. In one mower conditioner, the conditioner means extend at a substantial distance behind the cutter units, whereby in operation, the crop which is cut by the mower units is first discharged onto the ground before being picked-up and conveyed to the conditioning means. This is clearly a disadvantage as the movement of the crop through the machine is not fluent, which may sometimes result in jamming and/or inadequate conditioning. Also the risk of stones and other hard objects entering the conditioning means and damaging the same is increased. Furthermore, the risk of chopping of the cut crop at the discharge end of the mower means may be substantial.

Other mower conditioners with top driven rotary mower means comprise additional transition components between the mower means and the conditioner means. These transition components are stationary and may obstruct the fluent and uniform transitional movement of the cut crop from the mower means to the conditioner means.

Another disadvantage of known mower conditioners resides in the fact that the structure is one complete unit wherein the mower means normally cannot easily be separated from the conditioner means so that the mower means cannot be used as an independent mower, and the conditioner means of one type cannot be interchanged with conditioner means of another type.

A further disadvantage resides in the fact that all known mower conditioner means are relatively heavy structures, which therefore are often in the form of pull-type machines rather than tractor-mounted machines. As a result, the manoeuvrability of the known pull-type mower conditioners is rather disappointing. Also as these machines are heavy and rather conplicated, they are relatively expensive to manufacture.

SUMMARY OF THE INVENTION

It is the principle object of the present invention to overcome or to attenuate one or more of the aforementioned disadvantages of rotary type mowers and mower conditioners employing such mowers.

According to the present invention, a rotary mower comprises at least one rotary cutter unit mounted on a framework, the framework having at least one forwardly-extending lower support for rotatably supporting the cutter unit at its lower end, and a freely rotatable shield disposed at the foremost edge of the or each support underneath the or each cutter unit.

The axis of rotation of the or each shield is preferably inclined rearwardly from bottom to top and located in front of the axis of rotation of the associated cutter unit. Each shield is intended to prevent any build-up of material at the forward end of the associated stationary support. The shield therefore preferably extends beneath both the foreward end of the associated lower support and the associated lower support and the foremost portion of the associated cutter unit.

The framework may further comprise an upper transverse beam and at least one rearwardly and downwardly extending arm secured to the upper beam at one end and to the, or a respective, lower support at the other end, whereby the cutter units(s) can be of the drum type and rotatably mounted between the upper beam and the lower support(s). Preferably, two or more rotary cutter units and lower supports are provided together, where applicable, with two or more rearwardly and downwardly extending arms. The or each lower support may taper in a forward direction and have bearing means for the associated cutter unit located substantially at its foremost end. Seen in plan view, the forward ends of the lower supports, when two are provided, are closer to each other than the rearward ends thereof. Seen in sideview, the framework of the mower may have a substantially triangular shape. Rearwardly of the centreline of the cutter units, a lower reinforcing transverse beam may be provided between adjacent lower supports, with the undersurface of each lower beam being located above the undersurface of each lower support.

When an upper transverse beam is provided, the cutter units are preferably top driven by means of a belt drive. Therefore a gearbox with a fore-and-aft extending input shaft and a vertical output shaft may be arranged in front of the upper transverse beam. The belt drive of the or each cutter unit may extend between a vertical output shaft of the gearbox and the upper end of a central shaft of the or each cutter unit, which for this purpose extends through the upper transverse beam.

A mower in accordance with the invention may be fitted with crop conditioner means to provide a mower conditioner. Preferably, the conditioner means is an independent unit which can be detachably mounted on the mower framework, whereby the mower may be used with or without the conditioner means. The conditioner means may be of the type comprising two meshing rolls, one of which is made floating. The floating roll may be mounted on pivot arms which are pivotably mounted on the framework of the conditioner means and upon which spring means act to urge the floating roll towards the other roll. A set of four gears may be arranged to drive the conditioner rolls; two gears being mounted on respective shafts of the rolls, whilst a third gear is provided on a pivot shaft of the aforementioned pivot arms. The third gear meshes with the gear associated with the floating roll, and a fourth gear meshes with the third gear as well as with the gear which is associated with the other conditioner roll. In the case of a drum mower, the conditioner means conveniently extend immediately behind the cutter drums and substantially above the flanges of the same. The conditioner unit conveniently is mounted on the rearwardly and downwardly extending arms of the mower means, when provided, and driven from an additional transversely-extending output shaft of the aforementioned gearbox.

Other conditioner means may be employed, such as, for example, a single rotor impact flail or beater type. In these types of conditioner, a stationary covering may extend partially around the impact rotor and they may have a substantially horizontal axis of rotation. However, a pair of rotors may be provided rotatable about substantially vertical axes whereby in effect, two cooperating tedder like units are used. These units may comprise an array of spring tines which are operable, upon opposite rotation of the units, to condition the crop and to spread the crop evenly over the ground.

IN THE DRAWINGS

Mowers and mower conditioners embodying the present invention will now be described in greater detail, by way of example, with reference to the accompanying drawings, in which:

FIG. 1 is a somewhat schematic perspective view of one mower according to the invention, FIG. 2 is a side view of the mower of FIG. 1 on a larger scale and with portions broken away and others shown in cross-section for clarity, FIG. 2A is a view similar to the lower half of FIG. 2, but showing a modification of the mower illustrated in FIG. 2, FIG. 3 is a sectional view taken along the lines III—III of FIG. 2, FIG. 4 is a view similar to FIG. 2 of a mower conditioner embodying the mower of FIG. 1, FIG. 5 is a partial rear view of the machine of FIG. 4 with portions broken away for clarity, and FIG. 6 is a schematic top view of the machine of FIG. 4.

DESCRIPTION OF THE PREFERRED EMBODIMENT

Figure 1:
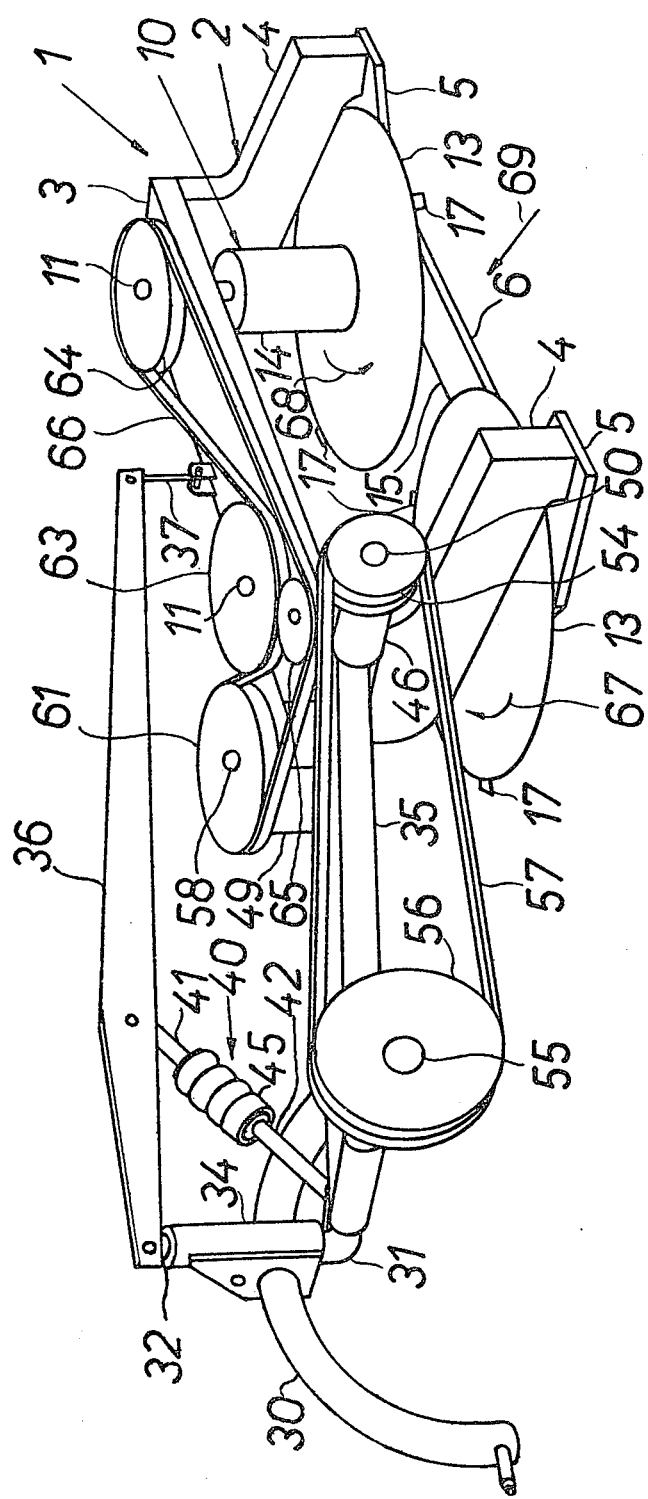
Figure 2:
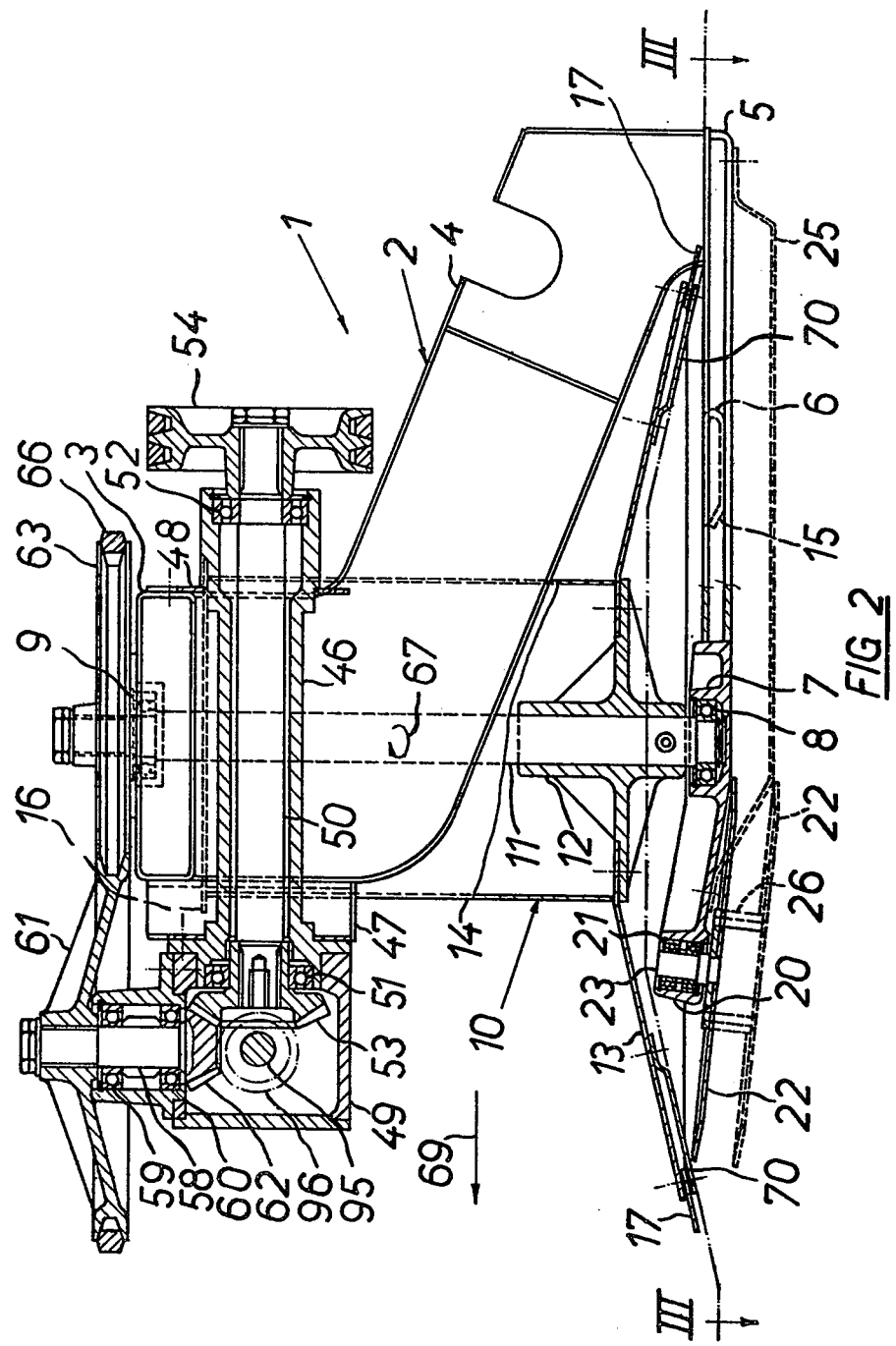

With reference to FIGS. 1 to 3, the mower is of the tractor-mounted type and is indicated generally at 1 and comprises a chassis 2 having a transversely-extending main and upper beam 3 and rearwardly and downwardly-extending arms 4 secured thereto. The chassis 2 further comprises horizontal elongated and forwardly-extending supports 5 secured to the lower ends of the arms 4. At their forward ends these supports 5 are closer to each other than at their rearward ends, that is, the supports 5 converge in the forward direction. A secondary transverse beam 6 extends between the supports 5 at a location rearwardly of the forward ends of the supports 5. The forward edge 15 of this beam 6 is upturned as seen best in FIG. 2. The supports 5 provide bearing seats 7 for bearings 8 and bearings 9 are provided in the upper main beam 3 aligned with respective bearings 8. Two cutter units 10 are rotatably mounted in respective upper and lower bearings 8 and 9, each cutter unit comprising a central shaft 11, a hub 12 mounted on the lower end of the shaft, a domed or frusto-conical annular knife-supporting flange 13 and a cylindrical body portion or drum 14. The flange 13 and drum 14 are supported on and suitably secured to the hub 12. The diameter of the cylindrical body portion 14 is less than half the diameter of the knife-supporting flange 13 and preferably, the diameter of the cylindrical body portion 14 is between one third and one quarter of the diameter of the knife-supporting flange 13. An optional reinforcing flange 16 is provided on top of the cylindrical body portion 14. Knives 17 are pivotally mounted on the underside of each knife-supporting flange 13 by respective structures (not shown) enabling easy and quick replacement of worn and damaged knives. The knives 17 are mounted in such a manner so as to be able to pivot around their supports and in operation, as a result of the centrifugal forces acting thereon, to protrude beyond the outer edge of the associated knife-supporting flange 13. Preferably two or three such knives 17 are provided per cutter unit 10, three being used in the present embodiment. Crop conveying and discharging elements (not shown) such as, for example, ribs may be provided on the outer circumference of the cylindrical body portion or drum 14 and/or on the upper side of the flange 13 in order continuously to discharge mown crop to the rear end of the mower.

The supports 5 have bearing seats 20 at their forward ends for the reception of bearings 21 in which are mounted freely-rotatable mud shields 22. The mud shields 22 are substantially flat circular discs of a diameter which is less than the diameter of the knife-supporting flanges 13 and each has an upwardly, and slightly rearwardly, directed shaft 23 for mounting the mud shields 22 in the bearings 21. The mud shields 22 extend completely underneath the forward sections of the knife-supporting flanges 13 (as seen best in FIG. 3) and reach in rearward direction underneath the forward ends of the supports 5. In the preferred embodiment of the mower 1, as seen in FIG. 2, wherein the mower is adapted for cutting very close to the ground, the supports 5 are relatively thin while the forward sections of the mud shields 22 extend at substantially the same level as the outer circumference of the flanges 13. In a modified embodiment of the mower 1, as fragmentarily seen in FIG. 2A, wherein the mower is adapted to cut at a considerably higher level, stationary spacers 25 are secured to the lower side of the supports 5, while spacers 26 are arranged between the mud shields 22 and the shafts 23. In the modified embodiment, the forward edge of the mud shields 22 are positioned substantially below the outer circumference of the flanges 13. In operation, the spacers 25 act as supports in a similar manner as the supports 5 do in the preferred embodiment. Essential in each of the foregoing embodiments is that the forward ends of the supports 5 or spacers 25 acting as supports are shielded by the mud shield 22.

Referring to FIG. 1, the suspension of the mower from a tractor (not shown) will be described. A three-point support linkage 30 of the well-known type is arranged to be attachable to the tractor. At the centreline of the three point support linkage 30 a pivot crank 31 with a vertical arm 32 and a horizontal arm (not seen) is provided. The vertical arm 32 of the pivot crank 31 is pivotally arranged in a vertical bushing 34. An intermediate beam 35 is pivotally mounted at one end to the horizontal arm and at the opposite end to the transverse main beam 3 of the mower structure. Another beam 36 extending parallel to the intermediate beam 35 is pivoted at one end to the upper end of the vertical arm 32 of the crank 31 which extends through the bushing 34 and at its other end to a link 37 which in turn is pivotally linked to the transverse main beam 3 at an intermediate location thereof. A bracket (not seen) is secured to the crank 31 at the location where the vertical arm 32 meets the horizontal arm 33. The bracket extends at an angle to the place containing the vertical and horizontal arms. A compensation mechanism, generally indicated at 40 is provided between the bracket and an intermediate location of the upper beam 36 and comprises telescopic sections 41 and 42 with rubber blocks 45 interposed therebetween. The telescopic sections 41, 42 are pivotally attached to the beam 36 and the bracket, respectively.

Figure 4:
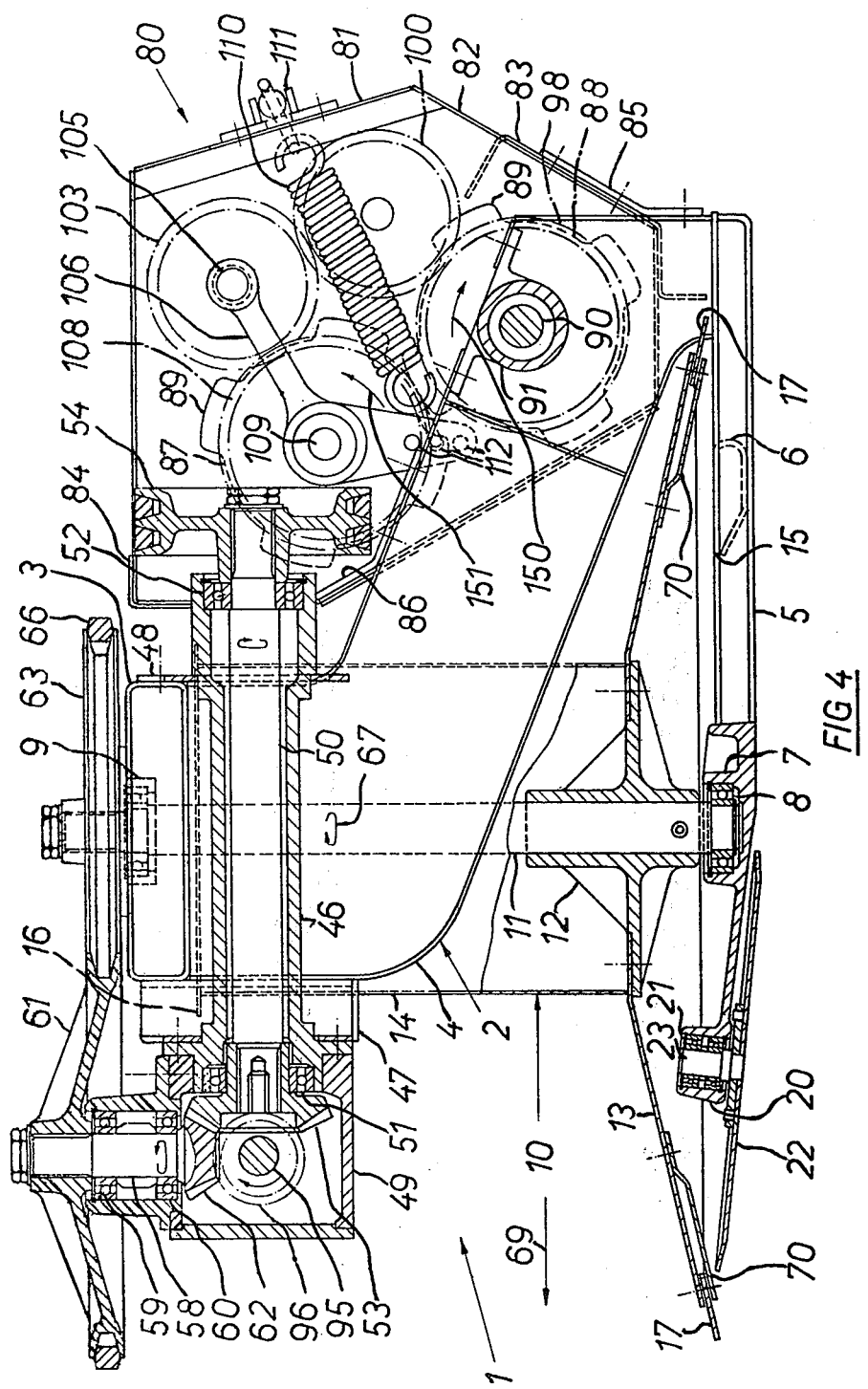

The end of the intermediate beam 35 which is opposite to the one pivoted around the horizontal arm of the crank 31 is pivoted around a hollow shaft 46 which itself is connected to the main transverse beam by means of connecting brackets 47 and 48 (FIGS. 2 and 4). The hollow shaft 46 extends parallel to the intended direction of foward operative motion of the machine when in its operative position. A gearbox 49 is mounted on the forward end of the hollow shaft 46 and comprises an input shaft 50 which extends coaxially within the hollow shaft 46 in bearings 51 and 52. The input shaft 50 supports a bevel gear 53 at the inner side of the gearbox and a double V-pulley 54 at the opposite end thereof. At the location of the threepoint support linkage 30, another shaft 55 (FIG. 1) is arranged in bearing means (not shown) secured to the underside of the intermediate beam 35, the shaft extending parallel to the shaft 50. A V-pulley 56 is keyed to the shaft 55 in a coplanar relationship with the V-pulley 54. Two V-belts 57 extend around both V-pulleys 54 and 56. The shaft 55 is provided with splines (not shown) at the end opposite to the pulley 56 to enable the coupling of the tractor PTO thereto by means of a universal joint transmission (also not shown).

Figure 6:
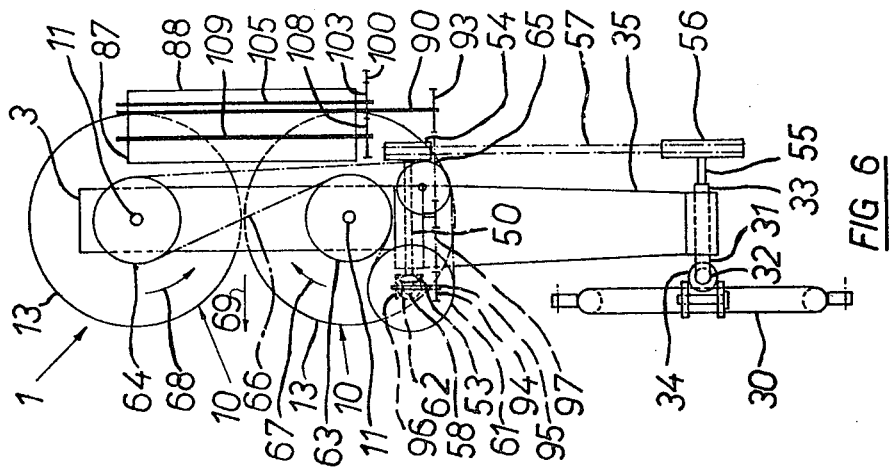

The gearbox 49 further has a vertical output shaft 58 supported on the upper side of the gearbox by bearings 59 and 60 and having at its upper end a V-pulley 61 which extends substantially horizontally. A bevel gear 62 keyed to the vertical output shaft 58 at the inner side of the gearbox meshes with the bevel gear 53 of the input shaft 50. The upper ends of the drum shafts 11 have V-pulleys 63-64 secured thereto at a location above the main transverse beam 3 and coplanar with the pulley 61 of the vertical output shaft 58. Further, a tension pulley 65 also is rotatably mounted on the main transverse beam 3 in alignment with the pulleys 61, 63 and 64 such that a belt 66 will extend around the pulleys 61, 63, 64 and 65 in a particular pattern for driving the cutter units 10 in opposite directions 67, 68 so that at the forward side of the machine the cutter units 10 are rotated towards each other. The forward direction of mower movement is indicated by arrow 69 (FIGS. 1 and 6). The coaxial arrangement of the shaft 50 and the pivot connection between the intermediate beam 35 and the mower means 1 enables the adjustment of the position of the mower relative to the ground and to the tractor without any disturbance of the drive transmission from the tractor PTO to the cutter units 10.

Figure 5:
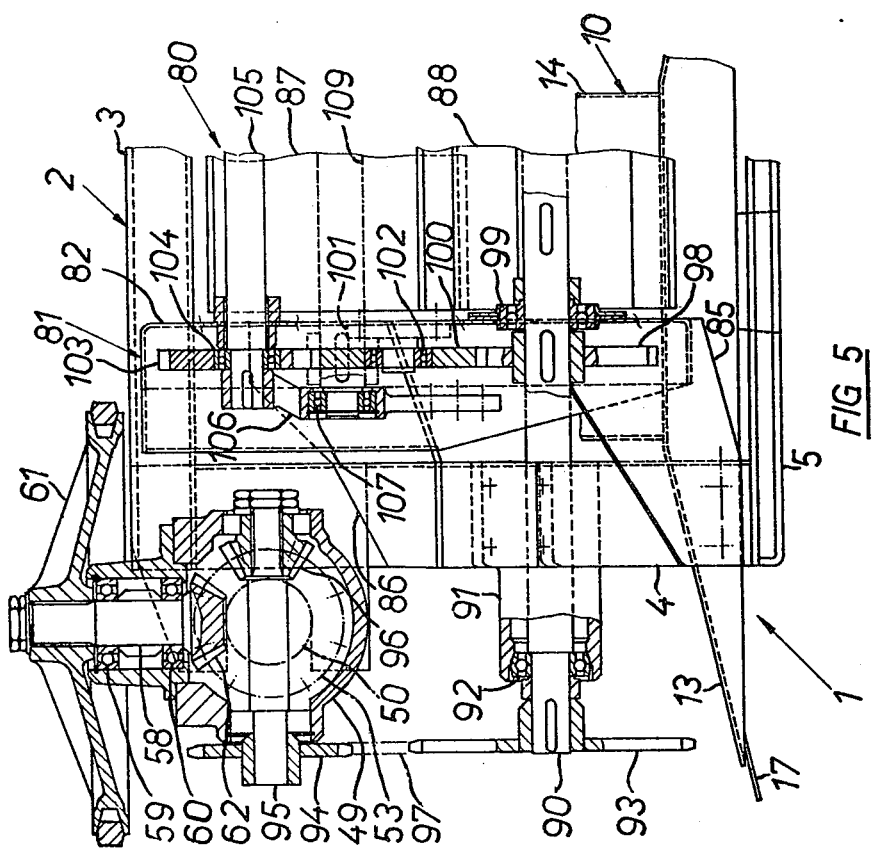

Referring now to FIGS. 4 to 6, a mower conditioner employing the mower 1 of FIG. 1 will now be described in more detail. Components of the mower conditioner which are identical to the components of the mower 1 are referenced with identical numerals.

Crop conditioner means are indicated in general at 80 and comprise an independent framework 81 having side walls 82 and transversely-extending beams 83 and 84. Mounting brackets 85 and 86 are secured to the framework 81 and extend outwardly to permit attachment of the conditioner means to the chassis 2 of the mower. The width of the framework 81 is such that it is adapted to fit inbetween the arms 4 of the chassis 2. When in the operative position, the conditioner means 80 extend substantially above the rear of the flanges 13 of the cutter units 10. The conditioner means 80 further comprise an upper and a lower intermeshing conditioning roll 87 and 88 respectively which are of a well known type comprising cooperating conditioning ribs 89 made of resilient material such as, for example, rubber material, although they may be of other form. The lower conditioner roll 88 comprises a shaft 90 extending at the left-hand side of the machine past the drum 14 of the left-hand cutter unit 10 (FIGS. 5, 6). A bearing 92 mounted in a bearing housing 91 rotatably supports this end of the shaft 90 on the left-hand side arm 4 of the chassis 2. A sprocket 93 is keyed to the shaft 90 at a location which is coplanar with another sprocket 94 which in turn is keyed on an additional output shaft 95 of the gearbox 49. The shaft 95 has a bevel gear 96 at the inner side of the gearbox for cooperating with the bevel gear 53 of the input shaft 50. A drive chain 97 extends between both sprockets 93 and 94. The shaft 90 further supports a gear 98 and is also borne in bearings 99 on the side panel 82 of the framework 81.

A further gear 100, meshing with the gear 98 is rotatably supported on the left-hand side panel 82 by means of a bearing 102 mounted on a support 101. Another gear 103 is borne by bearings 104 on a transversely extending shaft 105 which itself is rotatably mounted in the framework 81. The gears 100 and 103 mesh with each other. The transverse shaft 105 further supports a pivot crank arm 106 at each end. The upper conditioning roll 87 is rotatably mounted on the crank arms 106 via bearings 107. The gear 103 mounted on the transverse shaft 105 further meshes with a gear 108 keyed on the shaft 109 of the upper conditioning roll 87 and is operative to transmit drive motion to the shaft 109 and upper conditioning roll 87. The shaft 109 extends through elongated holes (not shown) in the side panels 82 for enabling vertical adjustment of the upper conditioner roll 87 and associated shaft 109. Spring means 110 extend between the outer ends of the respective crank arms 106 and a fixed support 111 of the framework 81 and are operative to urge the upper conditioner roll 87 towards the lower conditioner roll 88. As both ends of the upper conditioner roll 87 are supported on the pivot crank arms 106 which in turn are keyed to the transverse shaft 105, the conditioner roll 87 always remains in a parallel relationship to the lower conditioner roll 88.

To adjust the force exerted by the upper conditioner roll 87 on the crops, a plurality of attachment points, by way of opening 112, for the coil springs 110 are provided in the pivot cranks 106 and also, although during operation the supports 111 are fixed, these supports 111 can be displaced in an upward or downward direction to adjust the transmission ratio of the spring force on the roll 87. Also essential in the conditioner means is the fact that for an increased spacing between the conditioner rolls 87, 88 as a result of the insertion of crop or other material therebetween, the actual pressure of the upper roll 87 on the crop material is reduced. This is ncessary to ensure a continuous throughput of crop between the rolls, to avoid jamming should the layer of crop material become considerable, and to avoid damage to the rolls when large hard objects, such as stones for example, are fed through the conditioner rolls 87, 88. The particular arrangement of the pivot crank 106 and spring means 110 ensures that the foregoing objective is attained. Indeed the more the upper roll 87 is lifted, the more the transmission ratio, and hence the actual pressure exerted by the upper roll 87, is reduced. In operation, driving motion is supplied to the conditioner means via the chain drive 93, 94, 97. Driving motion supplied to the lower roll 88 is transmitted to the upper roll 87 via the gear train 98, 100, 103 and 108, whereby the drive is reversed. Thus both rolls 87, 88 are synchronously driven and the drive means do not interfere with the floating operation of the upper roll 87.

OPERATION

In operation, the mower is brought from its transport position into its operative position. This means the whole structure is pivoted around the vertical axis of the arm 32 of the pivot crank 31 and of the bushing 34 from a position extending substantially behind the tractor to a position substantially transverse to the forward direction of operative travel 69 and offset to the tractor. The mower structure is secured in this position by means of a safety latch of a well-known type which, therefore, is not further described in any detail. This latch is released if the mower hits a solid obstruction, such as a tree, and which would cause damage thereto. Once the mower structure is brought in its transverse operative position, the three point linkage 30 of the tractor is lowered until the mower structure touches the ground. The lower edge of the mud shields 22 normally contact the ground first. However, as these mud shields 22 extend substantially in front of the centre of gravity and as (as is well known) substantial play exists in the mounting means, particularly in the three point linkage 30 of the tractor, the mower structure will tilt slightly in a rearward direction, whereby the mower structure rests on the ground principally by means of the supports 5 or spacers 25 in case such spacers 25 have been provided. Thus a major percentage of the weight of the mower which is supported on the ground is taken by the supports 5. Of course, this percentage depends on the size of the location of the mud shields 22. For this reason, the mud shields 22 are preferably relatively small and located well ahead of the centre of gravity of the machine. Also the lower edge of the mud shields should not reach far below the stationary supports 5 or spacers 25, and a preferred arrangement is for the lower edges of the mud shields 22 to be generally flush with the lower surfaces of stationary supports 5 or spacers 25.

Further, provided the three point support linkage 30 of the tractor is lowered to the appropriate level, a portion of the weight of the mower is also supported on the tractor via the mounting means, comprising amongst others the compensation mechanism 40. When the mower is in its lifted or transport position, all of the weight is acting on the upper beam 36 and as a result thereof the resilient means 45 of compensation mechanism 40 are considerably compressed. Now, supposing the mower is lowered gradually the machine touches the ground at a certain moment. At that moment, the compensation mechanism 40, and more particularly the resilient means 45 thereof, start expanding. If lowering of the three point support linkage 30 is stopped, an equilibrium will be reached wherein the compensation means 40 have expanded to some extent only and whereupon a certain force is still applied thereby. As a result, a certain percentage of the total weight of the mower is supported on the ground via the supports 5 or spacers 25 and the mud shields 22, while the remainder of the weight will be supported on the three point support linkage 30 of the tractor via the upper beam 36, the compensation mechanism 40 and the crank 31. When the mower hits a bump in the ground, the compensation mechanism 40 will contract and hence the mower will move safely over the bump. Thus the compensation mechanism 40 is operative to provide a floatation mounting for the mower and support some of weight thereof.

Once the mower structure is brought into the operative position, the drive means are engaged and the cutter units 10 are driven as indicated by the arrows 67 and 68. The drive speed of the cutter units is relatively high and is preferably of the order of 80 metres/second at the outer circumferences of the flanges 13. The neighbouring flanges 13 and knives 17 extend at substantially the same level and as the mower units 10 are belt driven, this means that they are not driven at synchronised speeds, the paths of the knives 17 do not overlap and instead, the knife paths touch each other at a point inbetween the units 10. A stationary knife section (not shown) may be arranged at this point underneath the knife paths to ensure an overall clean cut without leaving any strips of uncut crops, although this provision is not essential.

When moving forwardly in a field with a crop to be cut, the knives 17 cut the stems of the crops slightly above the ground level. Cut crop falls on top of the flanges 13 and are conveyed and discharged through the opening inbetween the neighbouring drums 14 in rearward direction. The flanges 13 and the drums 14 ensure this conveying and discharging operation. Additional conveying and discharging ribs on the flanges 13 and/or on the drums 14 may assist therein.

During operation, the machine floats over any ground irregularities and when anything hits the freely-rotatable mud shields 22 at a location which is not straight ahead the axes 23 thereof, these shields are rotated. The same action occurs when some material, such as mud for example, tends to adhere to the mud shields 22, thereby avoiding any accumulation of the material which might otherwise give rise to stripping. In other words, the mud shields 22 are self-cleaning. The freely-rotatable mud shields 22 also prevent any accumulation of mud and/or other material from adhering to the forward edges of the stationary supports 5 or spacers 25.

It will also be clear that the above advantages of mowers constructed in accordance with the present invention also apply to mower conditioners employing such mowers, for example that shown in FIGS. 4–6. When conditioning of the cut crop is desired, then the appropriate conditioner means are attached to the chassis 2.

Referring to the conditioner means 80 as shown in FIGS. 4 and 5, the conditioner rolls 87, 88 extend above the rear end of the flanges 13 and are adapted to receive the cut crop which is flung in a rearward direction by said flanges 13 and the drums 14 and by any additional conveyor and discharge means, such as ribs secured to the mower units 10, which may be provided. The crop material enters the conditioning means without first being discharged onto the ground. The crops are moved between the upper and lower conditioner roll 87 ad 88 and are conditioned for faster drying in the field. Being conditioned means that the crop is squeezed and crackled in order to enable the juices to evaporate faster. Depending on the thickness of the mat of crop to be conditioned, th upper roll 87 is lifted against the spring force in order to accommodate the through passage of the mat. As described already, the forces applied by the upper roll 87 upon the mat may be varied by adjusting the position of the anchorage points of the springs 110 in the openings 112 or by shifting the anchorage point 111. Also as already described, the forces exerted on the mat decrease with an increasing spacing between both rolls 87, 88. This is necessary to avoid jamming of the rolls 87, 88 to ensure a continuous operation and to avoid damage to the rolls when a hard object of considerable size passes through the conditioner means. After being conditioned, the crop is discharged onto the ground into a fluffy windrow ready for drying.

MODIFICATIONS

Conditioner rolls of a form other than that shown in FIG. 4 may be used, such as the flail or beater type. The flails may extend from a hub which is rotated about either a substantially vertical or a substantially horizontal axis. The choice of conditioner means will depend primarily on the kind of crop to be conditioned. Artificial hay grass such as Ryegrass is preferably conditioned with the twin roll type of conditioner because of its gentle conditioning operation reducing leaf losses. Natural grass is preferably conditioned by the impact flail or beater type of conditioner because of its aggressiveness, although both kinds of grass referred to could in fact be treated with some form of flail or beater type of conditioner.

With the arrangement according to the present invention a strong, but nevertheless lightweight and compact mower, mower-conditioner can be obtained. The basic unit of the mower structure can be used as a mower but is also useful in combination with various types of conditioners and hence the machine is very versatile, which is particularly advantageous from the point of view of the manufacturer and the dealer and, to some extent, also from the point of view of the user. Furthermore, the components such as the drive means, the chassis, the suspension, the framework of the conditioner means, the conditioner means, etc. are very simple and lightweight which helps to minimise manufacturing costs, eases handling and service problems, and allows the machine to be tractor-mounted rather than a pull-type which would be more expensive and less manoeuverable.

I claim:

1. A crop harvester adapted to move in a crop field, comprising:
    a frame having at least one forwardly-extending lower support means for contacting the ground surface so as to provide support for said frame on the ground surface;
    a rotary mower unit on said frame;
    first means on said lower support means of said frame for rotatably mounting said mower unit at its bottom end generally above said lower support means for mowing standing crop;
    means for shielding the foremost end of said lower support means;
    second means on said lower support means being located proximate to the foremost end thereof and forwardly of said first mounting means for freely-rotatably mounting said shielding means and disposing the same underneath a forward portion of said rotary mower unit; and
    drive means for driving said rotary mower unit.

2. A crop harvester as recited in claim 1, wherein the axis of rotation of the freely-rotatable shielding means is located in front of the axis of rotation of the associated mower unit and is inclined rearwardly from bottom to top.

3. A crop harvester as recited in claim 1, wherein the shielding means extend beneath both the forward end of the associated lower support means and the foremost portion of the associated rotary mower unit.

4. A crop harvester adapted to move in a crop field comprising:
   an upper transverse beam;
   at least one forwardly-extending lower support means for contacting the ground surface;
   a rearwardly and downwardly extending arm secured to the upper transverse beam at one end and to the respective forwardly extending lower support means at the other end;
   a drum type rotary mower means having a cylindrical body and a flange at the lower end thereof being rotatably mounted between the upper transverse beam and the respective lower support means for mowing standing crops;
   means, freely-rotatably mounted proximate to the forward end of each support means and disposed underneath both the forward portion of the respective rotary mower means and the forward end of the associated support means for shielding the forward end of said associated support means and
   drive means for driving said rotary mower means 5. A crop harvester as recited in claim 4 wherein two side-by-side forwardly-extending support means are provided each of which is connected to the upper beam by one of said rearwardly and downwardly extending arms.

6. A crop harvester as recited in claim 5 wherein as seen in plan view, the two forwardly-extending support means are closer to each other at their forward ends than at their rearward ends.

7. A crop harvester as recited in claim 4 wherein each lower support means tapers in a forward direction and has bearing means for the associated mower means located at a position spaced rearwardly from its foremost end.

8. A crop harvester as recited in claim 7 wherein each lower support means has bearing means for the respective freely rotatable shielding means located substantially at its foremost end.

9. A crop harvester as recited in claim 4 wherein as seen in side view, the upper transverse beam, the lower forwardly-extending support means and the rearwardly and downwardly extending arms define a substantially triangularly shaped frame.

10. A crop harvester as recited in claim 4 wherein at least one pair of forwardly-extending support means are provided and further comprising a reinforcing transverse beam extending between each pair of adjacent lower supports.

11. A crop harvester as recited in claim 4 further comprising:
   a first spacer means secured to each support means so as to extend beneath the same and contact the ground surface for supporting the harvester on the ground surface; and
   a second spacer means secured to the forward end of each support means above the freely-rotatable shielding means for positioning the shielding means in shielding relation to the foremost edge of the first spacer means.

12. In a rotary mower adapted to move in the field and having an upper transverse beam, lower support means for contacting the ground surface, downwardly extending arms secured to the upper transverse beam at one end and to the lower support means at the other end, drum type rotary mower units rotatably mounted between the upper transverse beam and the lower support means for mowing standing crop and drive means for said mower units, the improvement comprising:
   means, freely-rotatably mounted proximate to the foremost end of the support means and disposed underneath both the forward portion of the respective rotary mower units and the foremost end of the support means for shielding the foremost end of said support means.

13. A crop harvester structure comprising:
   an upper transverse beam;
   elongated support means located proximately to the ground surface and extending in side-by-side relationship and in fore-and-aft direction; each pair of support means defining therebetween an elongated fore-and-aft extending recess;
   rearwardly and downwardly extending arms secured to the upper transverse beam at one end and to the rearward portion of the respective elongated support mans at the other end;
   drum type rotary mower units for mowing standing crop, each having a cylindrical body portion and a flange at the lower end thereof and being rotatably mounted around a generally vertically extending axis and between the upper transverse beam and the forward portion of the respective elongated support means; said flanges projecting beyond the forward and side edges of the respective support means;
   a transverse beam extending between each pair of adjacent elongated support means and rearwardly of the rotary axes of the mower units for reinforcing the harvester structure and
   drive means for driving the rotary mower units.

14. A crop harvester structure as recited in claim 13, further comprisiing a shielding means freely-rotatably mounted proximate to the forward end of each elongated support means and disposed underneath both the forward portion of the respective rotary mower unit and the forward end of the associated support means for shielding the foremost end of the respective support means.

15. A crop harvester structure as recited in claim 13 further comprising crop conditioner means for conditioning the crop after being mown; the crop conditioner means being detachably mounted on the rearwardly and downwardly extending arms at a location immediately behind the cylindrical body portions and substantially above the flanges of the mower units.

16. A crop harvester structure as recited in claim 15, wherein the conditioner means comprise two meshing rolls, one of which is made floating.

* * * * *